United States Patent

Wiener et al.

[11] Patent Number: 5,662,438
[45] Date of Patent: Sep. 2, 1997

[54] METHOD FOR PRODUCING CONTINUOUS CORRECTIONS IN HYPOID GEARS

[75] Inventors: Dieter Wiener, Ettlingen; Hartmuth Müller, Karlsruhe, both of Germany

[73] Assignee: Klingelnberg Sohne, Remscheid, Germany

[21] Appl. No.: 569,912

[22] Filed: Dec. 6, 1995

[30] Foreign Application Priority Data

Dec. 7, 1994 [DE] Germany ............... 44 43 513.4

[51] Int. Cl.$^6$ .................................................. B23F 9/10
[52] U.S. Cl. .............................. 409/26; 409/29; 451/47
[58] Field of Search ....................... 451/47; 409/12, 409/13, 26, 25, 27, 28, 29, 30, 31, 38, 39, 51

[56] References Cited

U.S. PATENT DOCUMENTS

| | | | |
|---|---|---|---|
| 3,964,369 | 6/1976 | Hunkeler | 409/26 |
| 4,353,671 | 10/1982 | Kotthaus | 409/26 |
| 4,374,513 | 2/1983 | Wiener | 125/11.03 |
| 4,981,402 | 1/1991 | Krenzer et al. | 409/26 |
| 5,114,287 | 5/1992 | Ervay et al. | 409/13 |
| 5,116,173 | 5/1992 | Goldrich | 451/47 |
| 5,174,699 | 12/1992 | Faulstich | 451/47 |

Primary Examiner—Daniel W. Howell
Assistant Examiner—Christopher Kirkman
Attorney, Agent, or Firm—Antonelli, Terry, Stout & Kraus, LLP

[57] ABSTRACT

The invention relates to a method for producing continuous corrections on a bevel gear, whereby by entering a plurality of corrections into the CNC control of the machine and interpolation between them, camber designs and even the designs of twists or the avoidance of twists on the tooth flanks can be performed by suitable superimposition of corrections on the inner and outer tooth tips with corrections of the plunger position.

2 Claims, 4 Drawing Sheets

METHOD FOR PRODUCING CONTINUOUS CORRECTIONS IN HYPOID GEARS

BACKGROUND OF THE INVENTION

1. Field of the Invention

The invention relates to a method for producing continuous tooth flank corrections on hypoid bevel gears, for example, on ring gears, with the teeth of the hypoid bevel gear being machined in a single operation on the concave and convex flanks by plunge-cut grinding or plunge milling using a CNC-controlled bevel gear cutting machine.

Advantageously, the method of the invention preferably may be performed on a universal, completely CNC-controlled bevel gear grinder made by the Klingelnberg Company, the WNC 30. This machine has five controlled axes, the workpiece rotational axis, which is required during hobbing to produce the correct tooth shape and in Formate® ring gear grinding for separation, together with a C-axis for the machine base angle and three coordinates X, Y, and Z. The second grinding wheel is not required for the process unless a separate rough and smooth grinding wheel are used. By plunging the grinding wheel in the axial direction, the two tooth flanks of the gash are machined in a single step. For this purpose the machine is set to a machine base angle δ. This produces an uncorrected ring gear toothing. For example, a ring gear can be produced with a constant tooth height as well as a ring gear with a tapering tooth height.

2. Description of the Prior Art

In the manufacture of so-called Formate® (registered trademark of Gleason Works, Rochester, N.Y. USA) ring gears, both flanks of the ring gear are final-machined on the concave and convex sides by plunge-cut grinding and plunge milling. Modifications of the toothing, in other words, changes in the supporting pattern, previously were performed exclusively on the pinion, including corrections to the lengthwise camber and pressure angle, which were previously possible on the bevel gear.

For some time it has been possible to make corrections to the ring gear using the so-called "flared-cup method" of the Gleason Company. In this process, the grinding wheel does not plunge in a single step, and machines the flanks by surface contact, but as a result of an inclination of the grinding wheel axis relative to the gash, linear contact results in the direction of the height of the tooth, and the lengthwise shape of the tooth is created by additional movements of the grinding wheel relative to the gear. As a result of the linear contact between the grinding wheel and the workpiece in the "flared-cup method" in contrast to areawise contact in pure Formate® grinding, corrections can be made on the tooth flanks. The method has the disadvantage, however, that a cumbersome machine adjustment calculation is required and time is lost as a result of the linear contact in the machining of ring gears.

The bevel gear grinder shown in FIG. 1 is completely CNC-controlled and has five controlled axes, namely, the workpiece rotational axis B that is required during hubbing to produce the correct tooth shape and in Formate® ring gear grinding for separation, as well as the C axis for the machine base angle and the three coordinate axes X, Y, and Z.

SUMMARY OF THE INVENTION

The objective of the invention is to provide a method for producing continuous corrections on hypoid bevel gears of the above-described type at the outset by means of which camber designs and shapes of twists on the tooth flanks can be performed preferably in a CNC-controlled machine continuously and with great accuracy.

The method makes it possible to make corrections, camber designs, and even the designs of twists on the tooth flanks of hypoid bevel gears by appropriate superimposition of corrections on the inner and outer tooth ends with corrections in the plunging position to avoid or produce twists.

The method is not only suitable for generating such cambers in plunge-ground hypoid bevel gears but wherever Formate® ring gears are produced not by the surface broaching method called Single-Cycle®, but by plunging. The method can be used, for example, in the Spirac method or when making Gleason Formate® ring gears with rod gauges, to produce an end relief (so-called Endrems®) internally or externally. With a suitable design, it is even possible to produce a hypoid bevel on the outer end of the tooth.

BRIEF DESCRIPTION OF THE DRAWINGS

The invention is shown as an example and partially schematically in the drawings in which.

DESCRIPTION OF THE PREFERRED EMBODIMENTS

Figure 1:
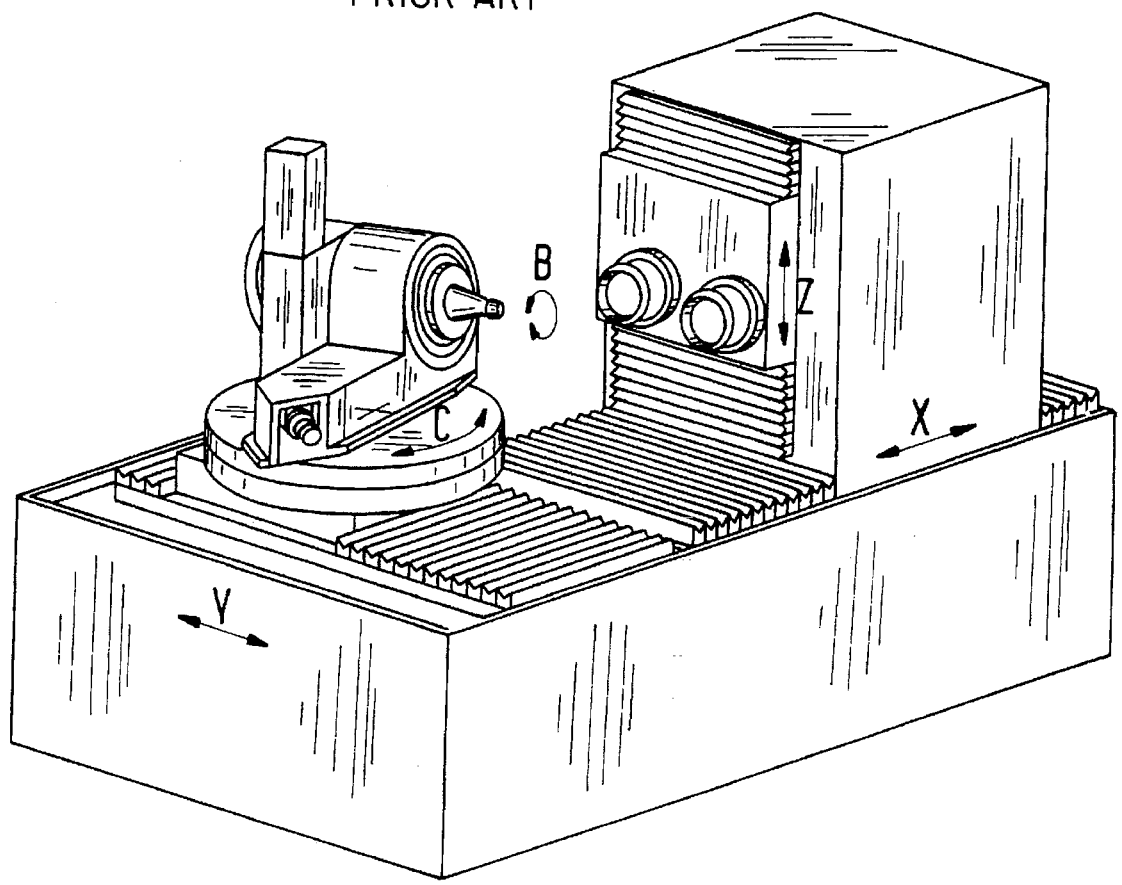
FIG. 1 shows a perspective view of a Klingelnberg WNC 30 bevel gear grinder with five CNC-controlled axes, as it exists in the prior art, in a perspective view.
Figure 2:
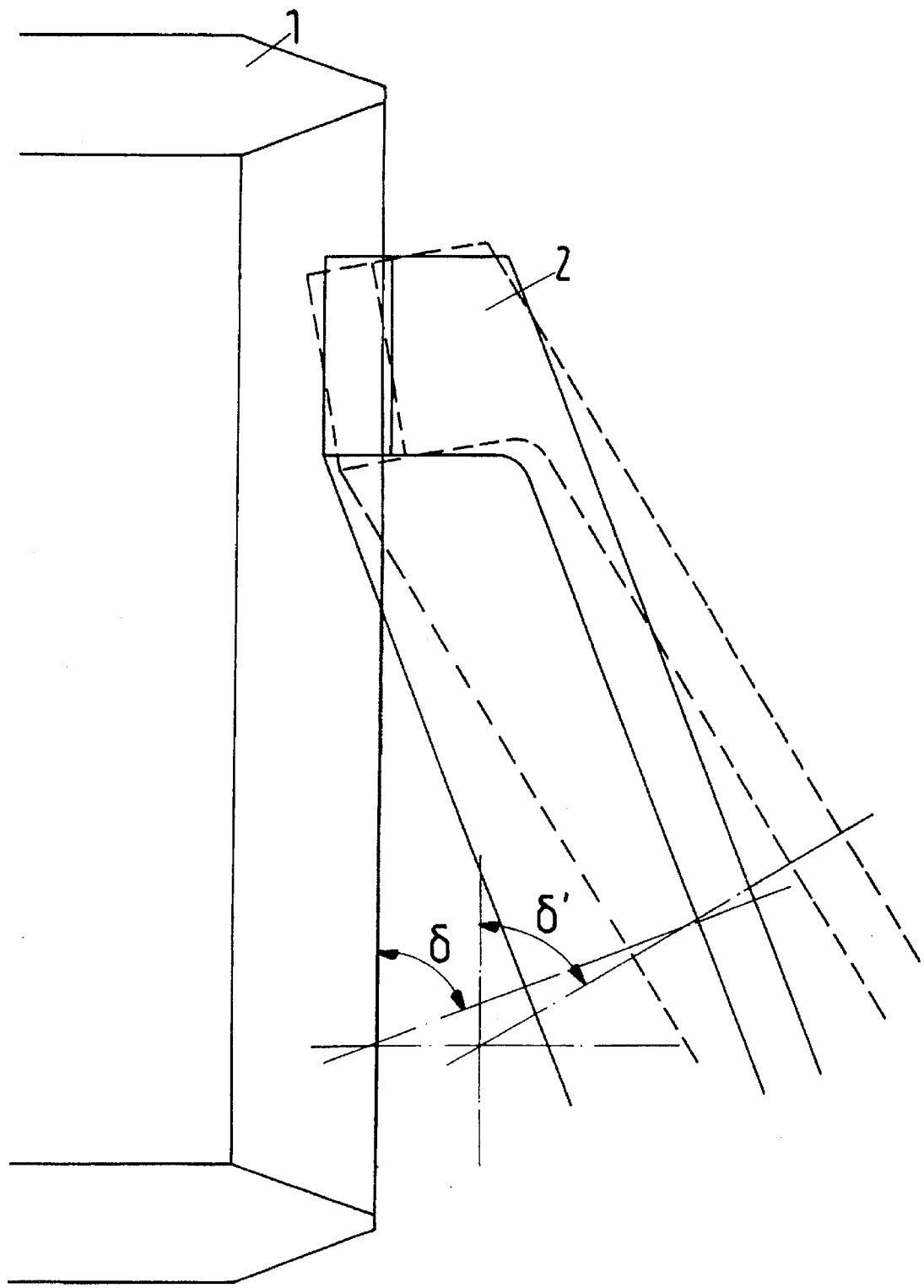
FIG. 2 shows a grinding wheel engaged with a ring gear, partially cut away in accordance with the present invention.

FIG. 2 shows a grinding wheel with reference numeral 1 that is engaging a ring gear 2 indicated by solid lines in a first position in accordance with the present invention. As usual, by plunging grinding wheel 1 in the axial direction, the two tooth flanks of the gash are machined in one step. For this purpose the machine is set to a machine base angle δ. As a result, uncorrected ring gear toothing is produced. FIG. 2 shows a ring gear with a constant tooth height, but a ring gear 2 with tapering tooth height can also be produced.

Figure 3:
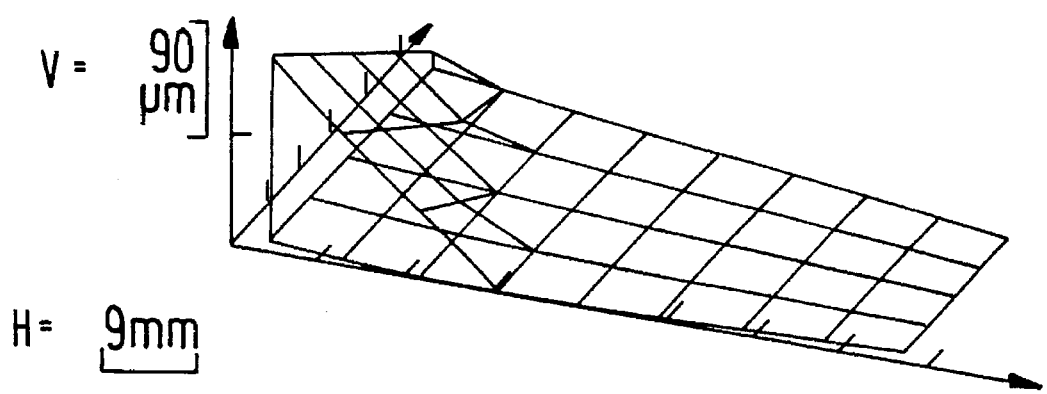
FIG. 3 is a flank comparison in a graphic representation in a system of coordinates, with only the machine base angle being corrected in accordance with the present invention (concave flank)

After the gash is produced in the pure Formate® method by changing the machine base angle δ to δ' the inner or outer tooth end of the toothing at the toe or heel is reduced. When angle δ is reduced to δ' (FIG. 2) the toothing at the both flanks at the outer tooth end is reduced. However, when angle δ is increased (not shown) the toothing on the inner tooth end is corrected. The depth must be guided accordingly for this purpose. The magnitude of the angle change from δ to δ' thus determines the slope angle of the correction. This is shown in FIG. 3 for a ring gear 2 in which V=90.00μ and H=9.000 mm. By guiding the depth over the X axis of the machine, the length L of the correction can be determined as illustrated in FIG. 4.

Figure 4:
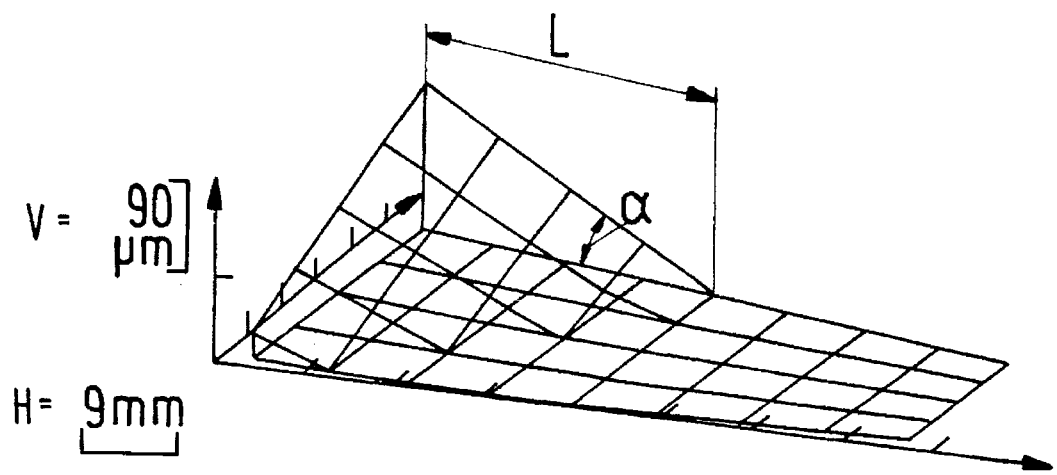
FIG. 4 shows a flank comparison in a graphic representation on a system of coordinates, where likewise only the machine base angle has been corrected in accordance with the present invention (concave flank)

As is evident from FIG. 4, in the correction range, a pressure angle deviation results that depends on the spiral angle of the gear to be toothed and the machine setting data. This pressure angle deviation can be compensated by changing the plunging position of grinding wheel 2, i.e., the positions of axes Y and Z. The B axes must be guided accordingly. At the same time, however, the amount of the correction between the two flanks, concave and convex, can be divided over the B axis. It is then possible either to divide the corrections uniformly or to correct only one flank. The corrections can be made continuously so that all desired amounts may be set.

Figure 5:
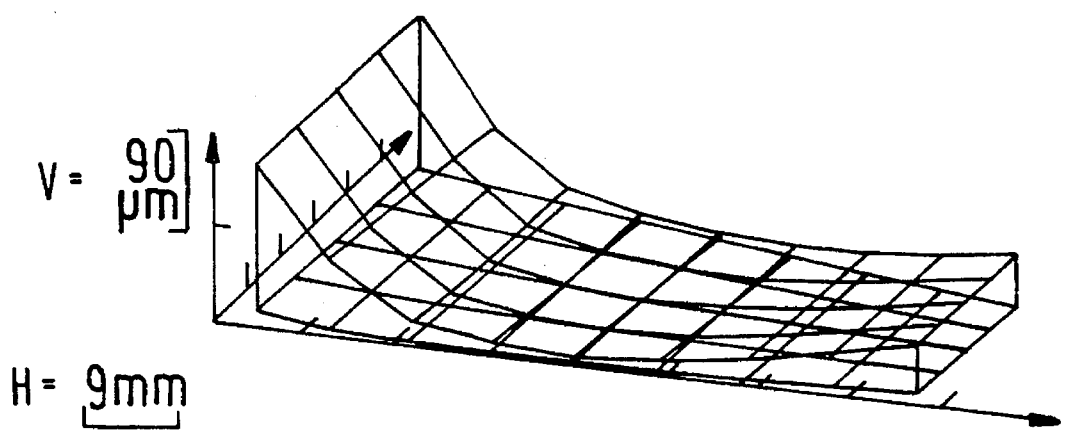
FIG. 5 shows a flank comparison during the entry of a plurality of correction positions, likewise in a graphic representation on a system of coordinates in accordance with the present invention (concave flank)
Figure 6:
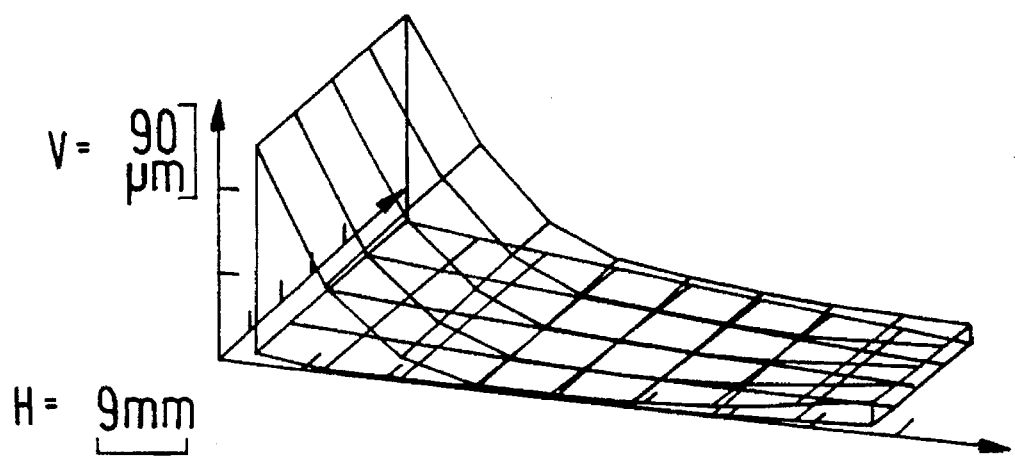
FIG. 6 is a similar flank comparison in accordance with the present invention (convex flank).

The break points shown in FIGS. 3 and 4 between the correction and the Uncorrected flank can be avoided by entering a plurality of correction positions in the CNC-control and interpolation between them by the control. The result of such a correction is seen in FIGS. 5 and 6 so that at the inner tooth end, in other words, at the toe, only a slight relief results, which takes place continuously and is no longer adversely affected by the pressure angle error, since the corresponding correction has been made. Such corrections are possible at either the toe and heel or separately at the toe and heel, whereby changes in camber can be made in any form on the flank.

The following is a listing of identification numbers and letters used in the specification and drawings.

1. Grinding wheel
2. Ring gear
B. Workpiece rotational axis
C. Axis for machine base angle
X. Axis
Y. Axis
Z. Axis
L. Length of correction
α. Pressure angle deviation
δ. Machine base angle
δ'. Machine base angle, modified.

While the present invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A method for producing continuous tooth flank corrections on hypoid bevel gears, with teeth of the hypoid bevel gears being machined on concave and convex flanks in a single operation by one of plunge grinding or plunge milling using a CNC-controlled bevel gear cutting machine, comprising:

changing a machine base angle (δ) defined by an intersection of a face of a cutting surface and a normal to a tooth being cut, removing by plunge grinding or plunge milling material from inner and outer gear tooth ends at a toe and/or a heel thereof, controlling a depth of the plunge grinding or plunge milling over one axis of the machine in such fashion so that when the machine base angle (δ) is reduced at the outer gear tooth end at the heel one of camber change or change of twists or a positioned correction of the heel is produced and so that when the machine base angle (δ) is increased at the inner tooth end at the toe one of camber change or a change of twists or a positioned correction of the toe is produced, the controlling being produced by entering a corresponding number of correction positions in the CNC controlled machine and interpolating therebetween to produce a continuous machine adjustment to make one of the corrections, camber change or a change of twists on tooth flanks by superimposition of the correction positions of the toe and the heel of the inner and the outer gear tooth ends with the correction positions being made with the plunge grinding or the plunge milling.

2. A method according to claim 1, wherein:

a pressure angle deviation is compensated by changing the plunge grinding or the plunge milling by means of corrections along axes with the first, second and third axes being orthogonal to each other and an axis of the cutting surface is guided relative to the axes.

* * * * *